(12) United States Patent
Gautier et al.

(10) Patent No.: US 7,154,982 B2
(45) Date of Patent: Dec. 26, 2006

(54) COMPACT PRESSURIZED WATER NUCLEAR REACTOR

(75) Inventors: Guy-Marie Gautier, Pertuis (FR); Jean-Francois Pignatel, Jouques (FR)

(73) Assignee: Commissariat a l'Energie Atomique, Paris (FR)

( * ) Notice: Subject to any disclaimer, the term of this patent is extended or adjusted under 35 U.S.C. 154(b) by 183 days.

(21) Appl. No.: 10/495,526

(22) PCT Filed: Nov. 25, 2002

(86) PCT No.: PCT/FR02/04030

§ 371 (c)(1),
(2), (4) Date: May 13, 2004

(87) PCT Pub. No.: WO03/046927

PCT Pub. Date: Jun. 5, 2003

(65) Prior Publication Data

US 2005/0018806 A1    Jan. 27, 2005

(30) Foreign Application Priority Data

Nov. 26, 2001   (FR) .................................. 01 15266

(51) Int. Cl.
*G21C 19/28* (2006.01)

(52) U.S. Cl. ....................... 376/406; 376/395; 376/402

(58) Field of Classification Search ................ 376/406, 376/402, 395
See application file for complete search history.

(56) References Cited

U.S. PATENT DOCUMENTS

| | | | | |
|---|---|---|---|---|
| 3,290,222 A | * | 12/1966 | Schoessow et al. | 376/282 |
| 3,325,374 A | * | 6/1967 | Margen | 376/406 |
| 4,057,467 A | * | 11/1977 | Kostrzewa | 376/406 |
| 4,072,563 A | | 2/1978 | McDonald et al. | |
| 4,897,240 A | * | 1/1990 | Sako | 376/328 |
| 5,045,274 A | * | 9/1991 | Donaldson | 376/318 |
| 5,102,616 A | * | 4/1992 | Gardner et al. | 376/282 |
| 5,349,617 A | * | 9/1994 | Gautier | 376/299 |
| 6,269,873 B1 | | 8/2001 | Gautier et al. | |
| 2003/0138069 A1 | | 7/2003 | Emin | |

FOREIGN PATENT DOCUMENTS

| | | |
|---|---|---|
| FR | 1.526.787 | 5/1968 |
| FR | 2 725 508 | 4/1996 |
| FR | 2 765 722 | 1/1999 |

* cited by examiner

*Primary Examiner*—Ricardo J. Palabrica
(74) *Attorney, Agent, or Firm*—Pearne & Gordon LLP

(57) ABSTRACT

A compact pressurised water nuclear reactor comprises a primary circuit fully integrated into the reactor vessel (10). Thus, a single steam generator (12) forms the cover of the vessel (10) and the pressuriser (30) and the primary pumps (28) are housed in the vessel (10). The same is true for the control mechanisms of the control rods (40). Finally, a venturi system (44) is also provided in the vessel (10) to create water circulation if there is a failure of the primary pumps (28).

6 Claims, 1 Drawing Sheet

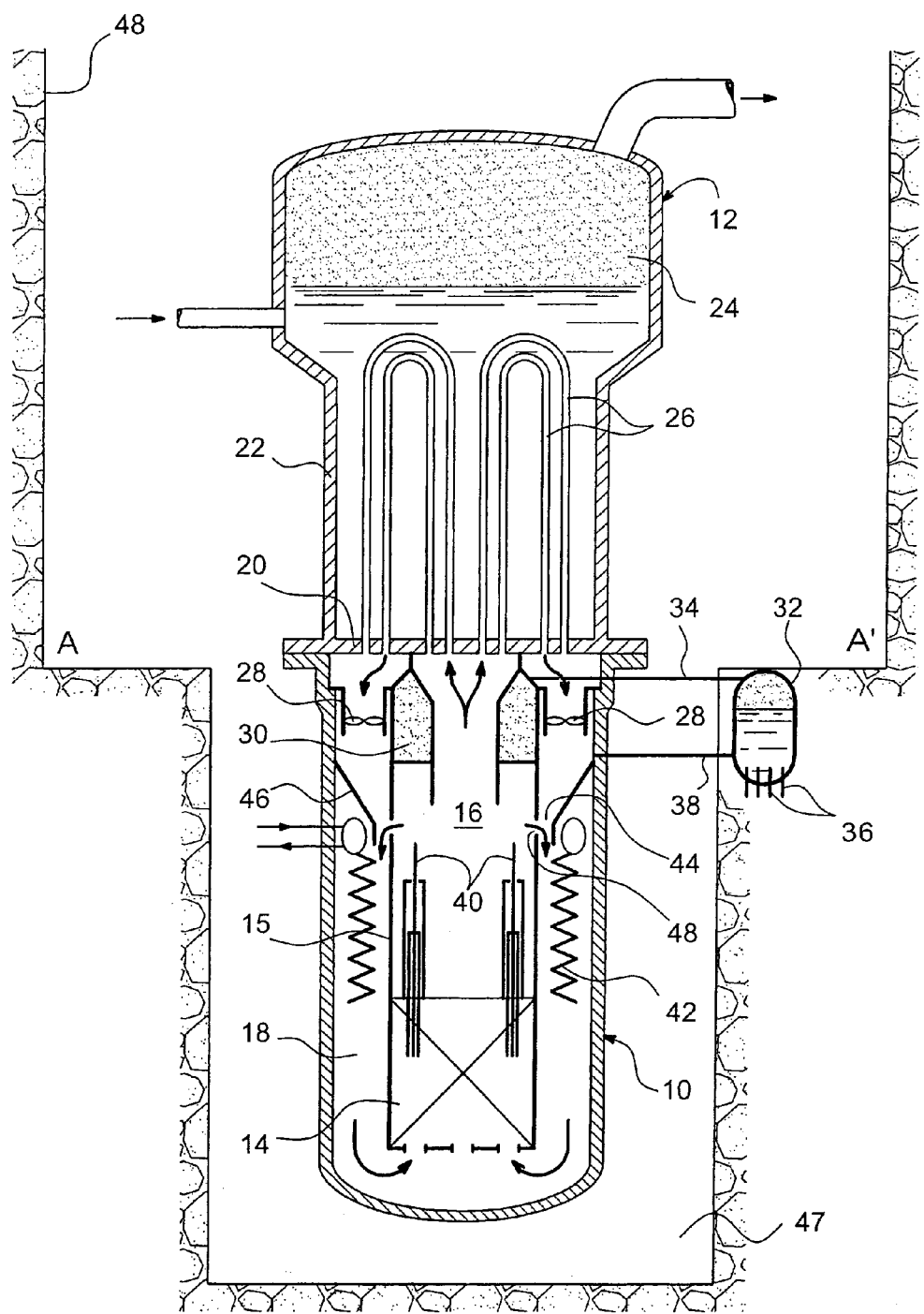

COMPACT PRESSURIZED WATER NUCLEAR REACTOR

TECHNICAL DOMAIN

This invention relates to a pressurised water nuclear reactor with an integrated and compact design.

The invention is particularly applicable to small and medium power nuclear reactors, in other words particularly reactors with a power less than or equal to approximately 600 MWe.

STATE OF THE PRIOR ART

Existing pressurised water nuclear reactors normally include a vessel containing the reactor core, primary circuits connecting the vessel to steam generators located outside the vessel, and primary pumps circulating pressurised water in each of the primary circuits, to transfer heat generated by the nuclear reaction in the reactor core, as far as the steam generators. A pressuriser, also located outside the vessel, pressurizes the water contained in the vessel and in the primary circuits.

In these existing nuclear reactors, secondary circuits connect each of the steam generators to a turbine that drives an alternator to transform heat originating from the primary circuit into electrical current. More precisely, in steam generators, this heat transforms water, circulated in the secondary circuits by secondary pumps, into steam. The steam that drives the turbine is then converted to the liquid state in a condenser.

"Integrated" pressurised water nuclear reactors and "compact" pressurised water nuclear reactors are also known.

Integrated reactors are different from previous reactors due to the fact that steam generators are located inside the reactor vessel, in an annular region delimited between the peripheral wall of the vessel and a partition inside the vessel. However, primary pumps remain located outside the vessel, to which they are connected by appropriate pipes. Control mechanisms of control bars are also located on the outside of the vessel, as in traditional reactors. A leaktight containment provides global confinement of the primary circuit.

In compact reactors, a single steam generator forms the vessel cover.

Conventionally designed pressurised water nuclear reactors of the integrated type or the compact type have been successfully used for many years, and many projects have been constructed using them.

However, they have a number of disadvantages that are a direct result of their design.

A first disadvantage relates to their design. The primary pumps and the pressuriser are located on the outside of the vessel. Control rods are driven by motors located on the outside of the vessel and the mechanism contains a bevel gear. The complexity of these devices makes it impossible to design high power cores in this way (more than 500 or 1000 MW thermal) due to the dimensions necessary for the large number of control rods.

A second disadvantage is their investment cost, particularly due to the architecture of buildings imposed by the design mentioned above.

Another disadvantage lies in the existence of a certain number of accident situations also inherent to the design of existing reactors. These situations make a large number of protection and residual power evacuation systems necessary, which significantly increase the cost of these reactors.

Moreover, existing pressurised water nuclear reactors only enable the use of traditionally designed nuclear fuel assemblies. Some more recently designed assemblies have substantial advantages that it would be desirable to be able to use.

PRESENTATION OF THE INVENTION

The purpose of the invention is to solve at least some of the problems that arise with existing pressurised water nuclear reactors.

More precisely, the purpose of the invention is particularly to propose a compact pressurised water nuclear reactor with an innovative design that makes it more economic in construction and inherently safer than existing reactors, while possibly enabling use of different types of nuclear fuel assemblies.

According to the invention, this objective is at least partially achieved by means of a compact pressurised water nuclear reactor comprising a vessel closed by a cover, a reactor core housed in the vessel, a steam generator forming the cover of the vessel, primary pumping means capable of making water circulate between the reactor core and the steam generator, and a pressuriser for pressurising water, characterised in that the pumping means and the pressuriser are housed in the reactor vessel so as to form a primary circuit fully integrated into the said vessel.

The fully integrated design of the reactor according to the invention reduces investment costs, particularly by simplifying the building architecture. This integrated design also eliminates a certain number of accident situations that are difficult to manage in terms of safety and for which expensive management systems are necessary.

According to one preferred embodiment of the invention, control mechanisms for the control rods are also integrated into the reactor vessel.

In the preferred embodiment of the invention, an approximately annular partition projects downwards from the cover and delimits a peripheral region and a central region inside the vessel. The reactor core is then housed in the bottom of the central region, the pressuriser is housed in the top of the central region, and the pumping means are housed in the top of the peripheral region.

Preferably, the pressuriser comprises an annular shaped reservoir with an inverse U-shaped cross-section, open downwards and the top of which communicates with a tank forming a steam source, means being provided for supplying water to the said tank taken from the peripheral region, below the pumping means.

Advantageously, a venturi system, supplied with water contained in the central region, is located in the peripheral region to create a natural water circulation in this region, from top to bottom, if there is a failure of the pumping means.

An emergency cooling exchanger may also advantageously be placed in the peripheral region below the venturi system.

In one preferred embodiment of the invention, the reactivity of the reactor core is controlled without any soluble neutron poison in the cooling water.

BRIEF DESCRIPTION OF THE DRAWINGS

We will now describe a preferred embodiment of the invention as an illustrative and non-restrictive example, with reference to the attached drawing in which the single FIG- URE is a side vertical sectional view, which diagrammatically represents a compact pressurised water nuclear reactor according to the invention.

DETAILED DESCRIPTION OF A PREFERRED EMBODIMENT OF THE INVENTION

As shown diagrammatically in the single FIGURE, the compact pressurised water nuclear reactor according to the invention comprises a vessel 10 with a vertical axis.

The top end of the vessel 10 comprises an opening normally closed by a steam generator 12 thus forming the cover of the vessel.

The closed volume contained inside the vessel 10, below the cover materialised by the steam generator 12, is delimited on the inside by an approximately annular partition 15 that projects downwards from the said cover. The partition 15, centred on the vertical axis of the vessel 10, thus separates this closed volume into a central region 16 and a peripheral region 18, which communicate with each other through the bottom of the vessel 10.

The reactor core 14 is located in the bottom of the central region 16. It is formed from nuclear fuel assemblies arranged in bundles along a vertical direction. These assemblies may be of a conventional design or they may be of a different type. If a different type is used, assemblies with a more recent design may particularly be used, such as advanced assemblies, for example actinide consumers.

As a non-limitative example, the core 14 of the reactor may in particular consist of 157 assemblies of 17×17 rods, as used in existing 900 MWe pressurised water reactors. However, the specific power is 25% less than these reactors.

This power reduction means that the soluble neutron poison usually used to control the core reactivity can be eliminated. It also makes it possible to envisage the use of different types of fuels, using the margins available on the critical flow due to the drop in the operating point and the drop in the power density. The drop in the power density also makes it possible to extend cycle durations, and therefore to increase availability.

The steam generator 12 comprises a horizontal base plate 20 forming the vessel cover itself and an outer enclosure 22 connected in a leaktight manner around the peripheral edge of the base plate 20 and delimiting a secondary closed space 24 with it. The steam generator 12 also comprises an inverted U-shaped tube bundle 26, located in the closed secondary space 24. More precisely, the two ends of each tube 26 are fixed to the base plate 20 such that one of these ends opens up in the central region 16 and the other end opens up in the peripheral region 18.

The closed volume delimited inside the vessel 10 and inside the tubes 26 forms the primary circuit of the reactor. This primary circuit is fully integrated and is filled with pressurised water.

Water is circulated in the reactor primary circuit by primary pumping means materialised by a certain number of primary pumps 28 housed directly in the top part of the peripheral region 18.

When they are in operation, the primary pumps 28 circulate water in the direction of the arrows shown in FIG. 1. In other words, the pumps 28 circulate water towards the bottom of the vessel 10 in the peripheral region 18, and then upwards through the core 14 in the central region 16 and finally from bottom to top, then from top to bottom in the tubes 26 of the steam generator 12.

In practice, the primary pumps 28 may be in different forms. Some useable pumps include particularly radial pumps, injector pumps and axial turbo-pumps.

Radial pumps are immersed rotor pumps arranged at the top of the vessel and oriented along a radial direction from the vertical axis of the vessel. This type of pump is described in reference [1].

In the case of injector pumps, the top part of the peripheral region 18 comprises a series of injectors or jet pumps. The injector is supplied at a low flow and high pressure so that most of the heat transporting fluid is circulated without it coming outside the vessel. The high-pressure supply flow to the injector originates from a pump outside the vessel.

Finally, vertical turbo-pumps may also be placed near the top of the peripheral region 18. The turbine is then supplied by high-pressure primary water originating from a pump located outside the vessel. The axial turbo-pump fulfils the same "hydraulic transformer" function as the injector in the previous case, but with a rotating part.

In the case of the vertical turbo-pump, the turbine may be replaced by an electric motor in which the windings are covered by a leaktightness skin to isolate them from the heat transporting fluid.

According to the invention, the pressuriser 30 is also integrated into the reactor vessel 10. More precisely, the pressuriser 30 is in the form of an annular shaped reservoir located in the top of the central region 16 of the vessel 10, immediately below the base plate 20. This reservoir is delimited by a wall that has an inverted U-shaped cross-section. The reservoir forming the pressuriser 30 is open downwards so as to open up directly into the central region 16 of the vessel 10.

The top part of the reservoir forming the pressuriser 30 is filled with steam. The top of the said reservoir is supplied with a two-phase steam-water mix through a pipe 34 connected to a small volume tank 32 located outside the vessel 10 and acting as a steam source. In this respect, the tank 32 is provided with heating rods 36. The water supply to the tank 32 is provided by another pipe 38 that connects the said tank to the peripheral region 18 of the vessel 10, just on the output side of the primary pumps 28.

Control rods 40 used to control reactivity in the reactor core 14 are also shown diagrammatically in FIG. 1.

Advantageously, the control rods 40 and their control mechanisms are also integrated into the reactor vessel. This arrangement is dictated by the fact that it is impossible to use standard mechanisms (electromagnetic mechanisms located outside the vessel) due to the presence of the steam generator above the vessel 10.

The particularly compact nature of the integrated control mechanisms enables the use of a control rod 40 for one or two nuclear fuel assemblies and eliminates the need for local power excursions due to ejection of a control rod, as is possible in a pressurised water reactor with the standard design. This means that the control rods 40 alone are capable of controlling reactivity in the core, which means that the soluble neutron poison in the cooling water of the reactor core 14 can be eliminated.

It is also possible to eliminate soluble neutron poison in the cooling water of the reactor core 14 due to the fact that the low power density makes it possible to accommodate slightly higher local power peaks than in pressurised water reactors with a standard design. The low power per unit volume and the lowering of the operating point compared with these standard reactors reduce reactivity control needs and also help to make it possible to eliminate soluble boron.

The choice of a core without a soluble neutron poison is also facilitated by the integrated design, which eliminates the possibility of several control rod control mechanisms becoming blocked due to a large primary break.

Note that elimination of the soluble neutron poison in the reactor core enables a major simplification of ancillary systems and a reduction of effluent disposal necessary to manage soluble poison, resulting in a significant reduction in the investing cost and maintenance and operating costs. However, it would be possible to envisage injection of a neutron poison such as borated water in an accident situation.

The control rods with control mechanisms integrated in the reactor vessel 10 may be composed either of a system of rods controlled by a hydraulic device, or by a system of fluid rods, or by both of these systems combined to provide redundancy.

Control rods controlled by a hydraulic device are described particularly in reference [2]. This type of mechanism consists of a hollow piston and a mobile cylinder. The piston is fixed to the support plate of the core and the cylinder is grooved near the bottom. The geometries of the piston and the cylinder grooves are identical. The cylinder is held in position by allowing a given flow of primary fluid inside the piston. The cylinder can thus be raised or lowered by a height equal to the pitch of the grooves, by temporarily increasing or reducing this primary fluid flow.

Document FR-A-2 765 722 describes the fluid rods system. In this system, a liquid salt containing neutron absorbents is displaced in the core through a bundle of guide tubes. These absorbents are moved by means of a gas acting as a piston and acting on the salt. The absorbent salt reserve is located above the assemblies. The core power can be cut off automatically by introducing absorbents quickly. The axial and radial distributions of the absorbent salt may be controlled in order to flatten the flux shape in the core.

The operating point of the compact reactor according to the invention is advantageously chosen at a relatively low pressure and temperature. Thus, a pressure of about 80 to 90 bars in the primary circuit is used.

With these operating characteristics, it is possible to envisage a significant reduction in the thicknesses of components resisting pressure, such as the vessel, the steam generator and the thickness of the steam generator base plate 20, a significant increase in the combustion rate, a reduction in duct corrosion and a simplification of protection systems.

For this operating point, the pressure in the secondary circuit is about 30 bars, which leads to a net efficiency of 30%. The thermal power of the core is 2000 MW.

As is also illustrated in the single figure, the compact reactor according to the invention is preferably provided with protection or safety systems.

These protection systems include means of evacuating the residual power, means of a safety injection and means of controlling the primary pressure.

Means of evacuating the residual power are placed firstly on the primary circuit and secondly on the secondary circuit of the reactor. This arrangement enables diversity of means as a function of the abnormal transient, taking account of the fact that the reactor comprises a single steam generator.

The power evacuation system installed on the primary circuit includes heat exchangers 42 located in the peripheral region 18 of the vessel. These exchangers are connected to a standby cooling circuit (not shown) outside the reactor vessel 10.

The system located on the primary circuit also includes a venturi system 44 located in the peripheral region 18 above the exchangers 42. The venturi system 44 is formed between the partition 15 and a shell 46 connected to the peripheral wall of the vessel 10. The shape of the shell 46 is such that the flow cross-section progressively reduces towards the bottom in the inside of the peripheral region 18, as far as a throttle formed at the bottom of the venturi system 44. The venturi system is supplied with water from the central region 16 at this throttle through openings 48 provided for this purpose in the partition 15. The venturi is sized such that during normal operation, the pressure at 44 is approximately equal to the pressure at 48. In this way, the short circuit flow between the region 16 and the region 18 may be minimised. In the pumps shutdown situation, the openings 48 enable natural convection between the core 14 and exchangers 42 to evacuate power released in the core.

In particular, the residual power evacuation system installed on the secondary circuit, which does not form part of the invention, may include a condensation system at the secondary associated with a thermal valve, or a system with a steam injector.

In the first case, the condensation system at the secondary may in particular be of the type described in reference [3] and the thermal valve may be of the type described in document FR-A-2 725 508.

Moreover, a steam injector system may be made in the manner described in reference [4].

Safety injection means may also be provided to ensure that sufficient water is present in the primary circuit in case of accident. However, a low flow system is sufficient due to the fact that large breaks are eliminated by the completely integrated design of the reactor. If the pressure in the primary circuit is low, the discharge pressure from the safety injection system may for example be about 25 bars.

Concerning control of primary pressure in the case of a failure of all protection systems except for the passive system installed in the primary circuit, studies have shown that accident transients can be managed by avoiding a meltdown of the pressurised core, without a specific depressurisation system in the primary circuit (reference [5]).

In particular, confinement of the compact reactor that has just been described may include a pressure elimination containment 47 containing the primary circuit. This containment may then be limited to the volume of the compartment located under the horizontal junction plane of the vessel 10 and the steam generator 12. The steam generator is then located in a pool 48 above this plane, used for core reloading and maintenance operations.

In this arrangement, the confinement containment can be made inert over a small volume. The consequence of this is to limit the investment cost and to enable relatively easy management of the risk of explosion due to the presence of hydrogen.

In the case of a serious accident, corium can be cooled by reflooding the vessel sump but there would be no need to provide an external recuperator. This is made possible due to the fact that the power and the power density in the core are smaller than the corresponding values in an existing 900 MWe pressurised water reactor.

Obviously, the invention is not restricted to the embodiment that has just been described as an example. In particular, the shape of the pressuriser 30 may be different from the shape illustrated in FIG. 1, without departing from the scope of the invention.

REFERENCES

[1] "Design of Safe Integral Reactor", R. A. Matzie, Nuclear Engineering and design, vol. 136 (1992) p. 72–83.

[2] de Bathéja P. et al. "Design and testing of the reactor internal hydraulic control rod drive for the nuclear heating plant", Nuclear technology, 1987, vol. 79, pages 186 to 195.

[3] "A 900 MWe PWR residual heat removal with a passive secondary condensing system", ICONE 5 proceedings, May 29–30, 1997, Nice (France).

[4] "Design and testing of passive heat removal system with Ejector-Condenser.—Progress in Design, research and development and testing of safety systems for advanced water cooled reactors" by K. I. Soplenkov & al. in Proceedings of a Technical Committee meeting held in Piacenza, Italy, May 16–19 1995.

[5] G. M. Gautier, Passive heat removal system with the "Base operation passive heat removal" strategy, ICONE 7 proceedings—Apr. 19–23, 1999, Tokyo (Japan).

The invention claimed is:

1. Compact pressurised water nuclear reactor, comprising
    a vessel closed by a cover,
    a reactor core housed in the vessel,
    a steam generator including a base plate forming the cover of the vessel,
    an outer enclosure delimiting a secondary closed space with the base plate and an inverted U-shaped tube bundle located in the secondary closed space with two ends of each tube fixed to the base plate and opening in the reactor vessel,
    primary pumping means housed in the vessel and capable of making water circulate between the reactor core and the steam generator,
    and a pressuriser for pressurising water,
    wherein the pressuriser is housed in the reactor vessel and comprises an annular shaped reservoir with an inverted U-shaped cross-section, the top of said reservoir communicates with a tank forming a steam source, and an approximately annular partition projects downwards from the cover and delimits a peripheral region and a central region inside the vessel, the reactor core being housed in the bottom of the central region, the pressuriser being housed in the top of the central region, the pumping means being housed in the top of the peripheral region, one end of each tube opening in the central region and the other end of each tube opening in the peripheral region.

2. Compact pressurised water nuclear reactor according to claim 1, in which control mechanisms for control rods are also integrated into the reactor vessel.

3. Compact pressurised water nuclear reactor according to claim 1, in which pipe means are provided for supplying water to the said tank taken from the peripheral region, below the pumping means.

4. Compact pressurised water nuclear reactor according to claim 1, in which a venturi system, supplied with water contained in the central region, is located in the peripheral region to create a natural water circulation in this region, from top to bottom, if there is a failure of the pumping means.

5. Compact pressurised water nuclear reactor according to claim 4, in which an emergency cooling exchanger is also placed in the peripheral region below the venturi system.

6. Compact pressurised water nuclear reactor according to claim 1, in which the reactivity of the core is controlled without any soluble neutron poison in the cooling water.

* * * * *